United States Patent [19]

Modglin

[11] Patent Number: 4,837,418
[45] Date of Patent: Jun. 6, 1989

[54] METHOD AND APPARATUS FOR FORMING WELDED RINGS

[75] Inventor: Donald D. Modglin, Nashville, Tenn.

[73] Assignee: Merrick Engineering, Inc., Nashville, Tenn.

[21] Appl. No.: 14,805

[22] Filed: Feb. 13, 1987

[51] Int. Cl.[4] .............................................. B23K 9/00
[52] U.S. Cl. .......................... 219/121.45; 219/121.46; 219/61.11; 219/64; 219/137 R; 219/121.58
[58] Field of Search .......... 219/101, 121 PY, 121 PJ, 219/121 PK, 121 PX, 121 PU, 121 P, 137 R, 64, 61.11, 60 R, 59, 60.2

[56] References Cited

U.S. PATENT DOCUMENTS

| | | | |
|---|---|---|---|
| 3,241,347 | 3/1966 | Seeloff | 219/61.11 |
| 4,110,577 | 8/1978 | Spisak | 219/121 PJ |
| 4,159,410 | 6/1979 | Cooper | 219/121 PJ |
| 4,282,418 | 8/1981 | Wuestner | 219/121 PJ |
| 4,345,137 | 8/1982 | Mignien et al. | 219/121 PJ |

Primary Examiner—M. H. Paschall
Attorney, Agent, or Firm—James G. Staples

[57] ABSTRACT

A welding machine for welding opposed ends of a forming blank using a micro plasma welding device. The blank formed into a ring and the ends of the ring are clamped in an opposed manner and welded. The next blank to be formed is clamped prior to completion of ejection of the preceding welded ring.

14 Claims, 6 Drawing Sheets

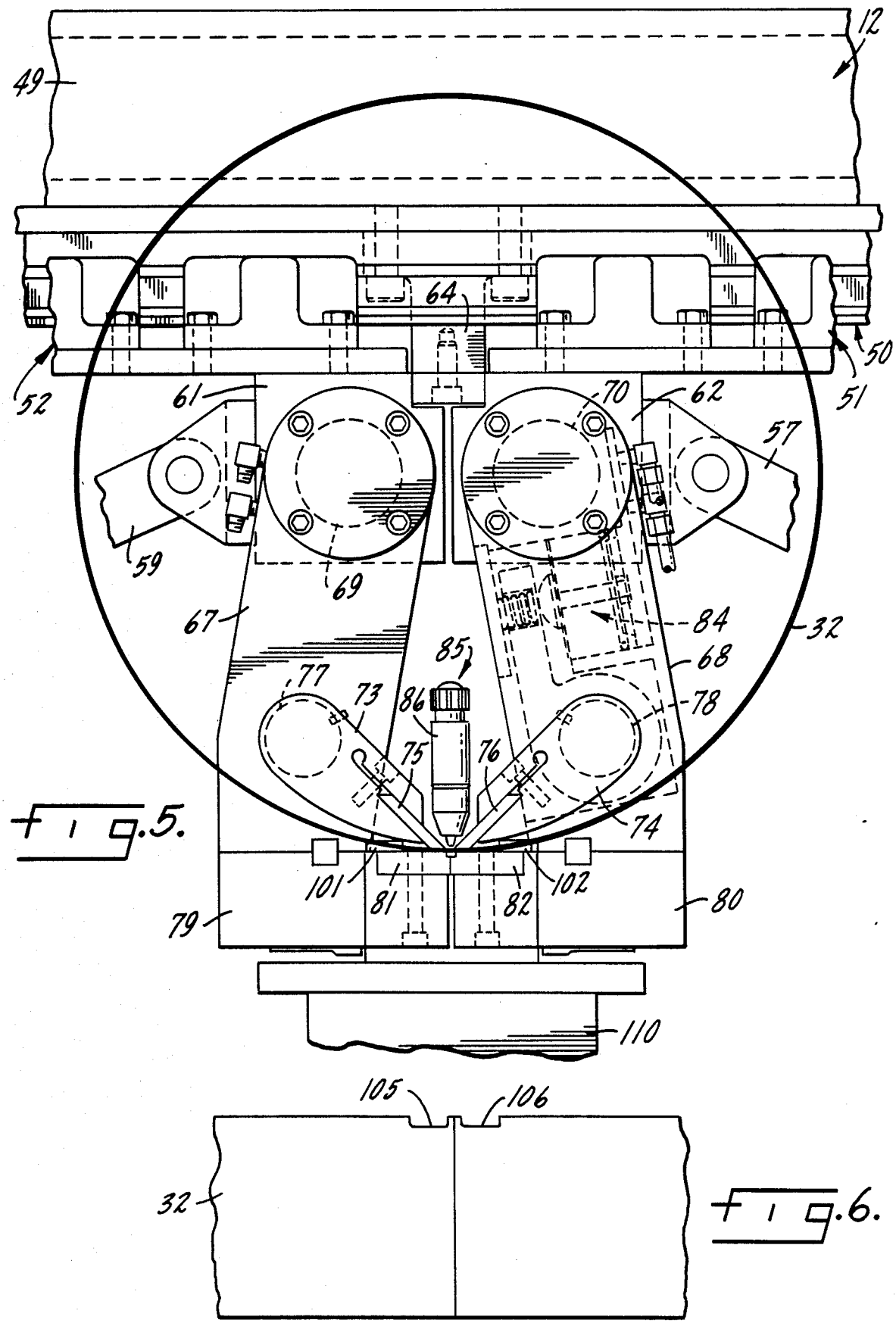

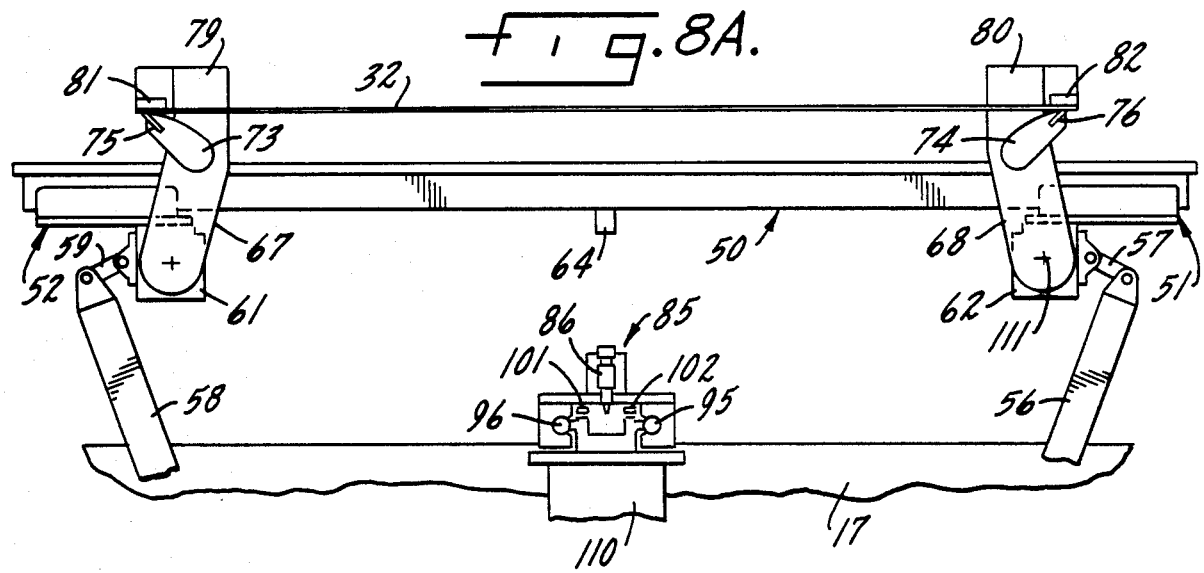
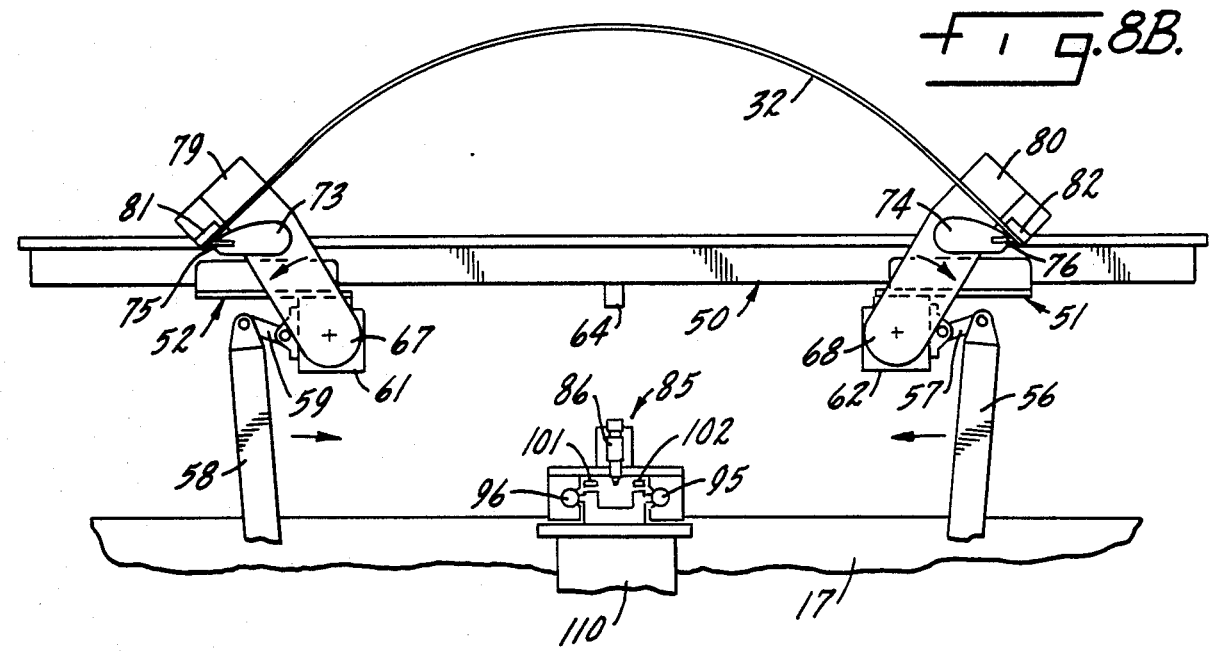
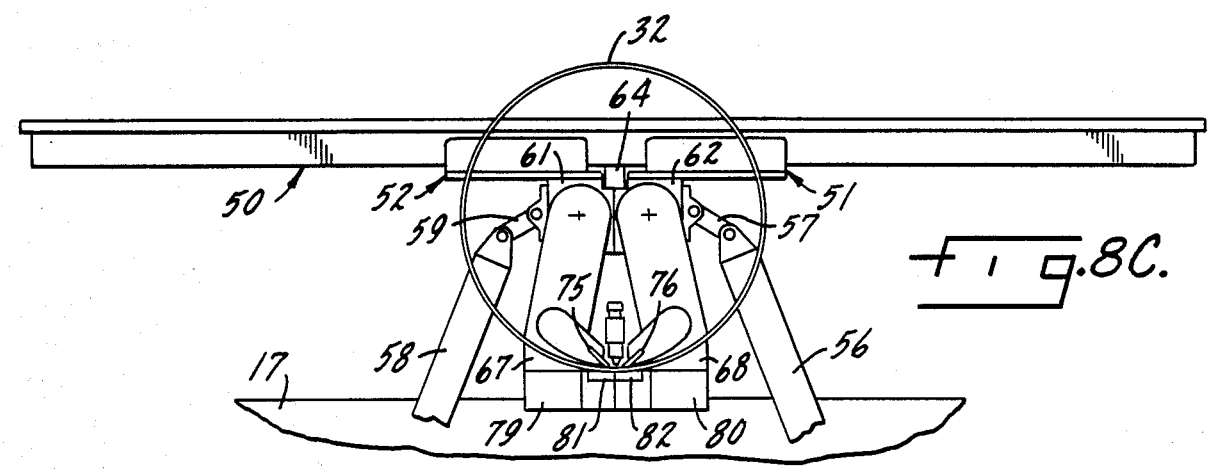

METHOD AND APPARATUS FOR FORMING WELDED RINGS

This invention relates generally to welding machines and more specifically to a machine for making rings by micro plasma welding of clamped, opposed ends of a forming blank using a completely automatic sequence of operations.

SUMMARY OF THE INVENTION

A primary object of the invention is to provide a ring welding machine.

Another object is to provide a ring welding machine in which the formation of stress relief notches is incorporated in the blank forming operation whereby a separate notching operation following formation of the welded ring is avoided.

Another object is to provide a welding machine having an extremely short cycle of operation measured from start of feed of blank stock to start of feed of blank stock whereby the only practical limits on the cycle time are the width of the stock to be welded and welding torch speed.

Yet another object is to provide an automatic method of welding of strip steel stock in a production machine.

Another object is to provide a method of welding in which the blank forming and blank welding operations overlap to thereby provide an extremely short operating cycle in a welding machine.

Other objects and advantages will be apparent from the description of the invention.

BRIEF DESCRIPTION OF THE DRAWING

The invention is illustrated more or less diagrammatically in the accompanying drawing wherein:

FIG. 5 is a front elevation view of the weld clamping members to an enlarged scale as contrasted to FIG. 1;

FIG. 6 is a partial view of the welded ring illustrating the notching which is incorporated in the cycle; FIGS. 8A, 8B and 8C are elevation views showing progressive steps of the clamping operation in the cycle of operation.

DETAILED DESCRIPTION OF THE INVENTION

Figure 1:
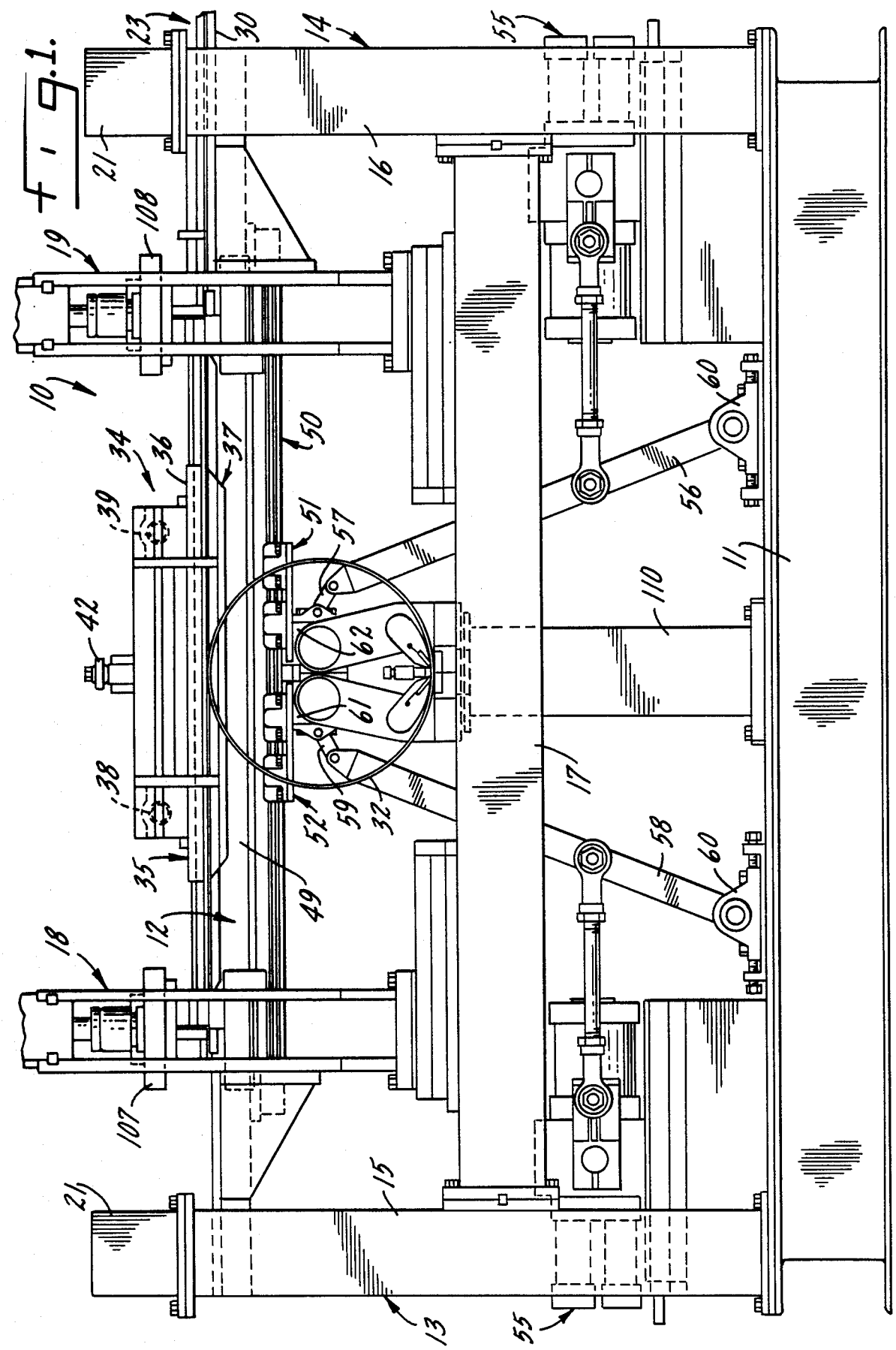
FIG. 1 is a front elevation of the micro plasma torch welding machine of this invention.

Like reference numerals will be used to refer to like parts from Figure to Figure in the drawing.

An overview of the invention can be most easily appreciated from FIGS. 7 and 8 and accordingly the invention will be preliminary described with reference to those Figures. FIGS. 7A, 7B and 7C, which are top views of a portion of the operational sequence with many parts omitted for clarity, show the first three operative steps in the forming of a welded ring and disclose the relationship between the clamping means and the weld gripping means. FIGS. 8A, 8B and 8C, which are elevation views of the steps in the forming of a welded ring, disclose the operation of the weld gripping means only, together with the torch means.

Figure 7A:
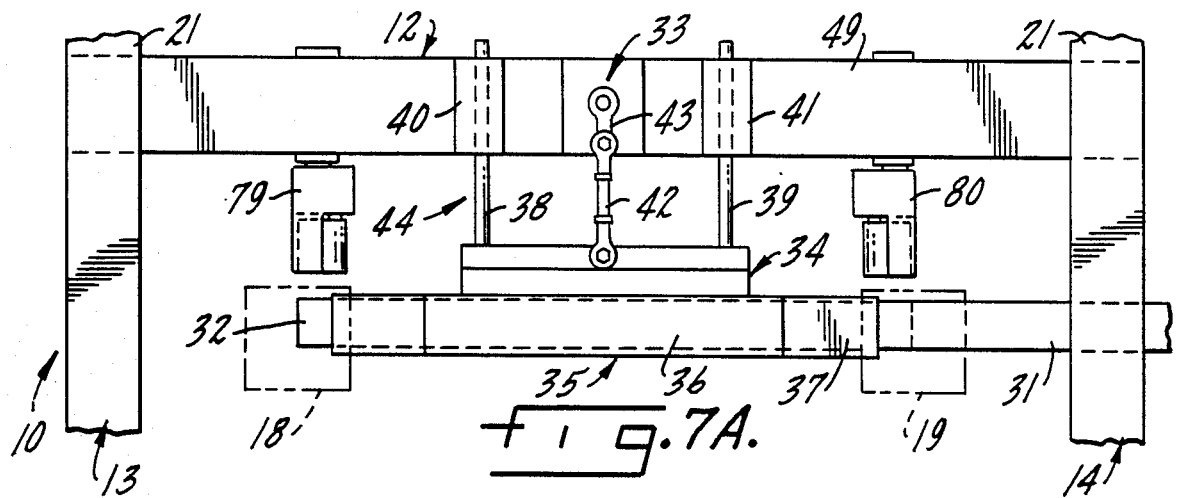
FIGS. 7A, 7B and 7C are top plan views showing progressive loading steps of a ring blank in the cycle of operation.

Referring first to FIG. 7A, a frame structure is indicated generally at 10, the frame structure having two cross members, 13 and 14, and a back member, 12. A pair of die blocks are indicated at 18 and 19, die block 19 severing the free end portion of a source of steel strip 31 to form a blank 32. Die block 18 may, if desired, include a trim die to insure a perfectly square end on the leading, free end of the blank 32. A clamping system is indicated generally at 34, the clamping system including a clamp member 35 which is reciprocated between the positions of FIG. 7A (and 7C) and 7B by a clamp positioning system indicated generally at 44, the system including a mounting structure 33, guide rods 38 and 39, and an articulated linkage 42 which, when actuated, causes the clamp member to move from the position of FIG. 7A to FIG. 7B and then return to the position of FIG. 7C preparatory to the commencement of the next cycle.

Figure 7B:
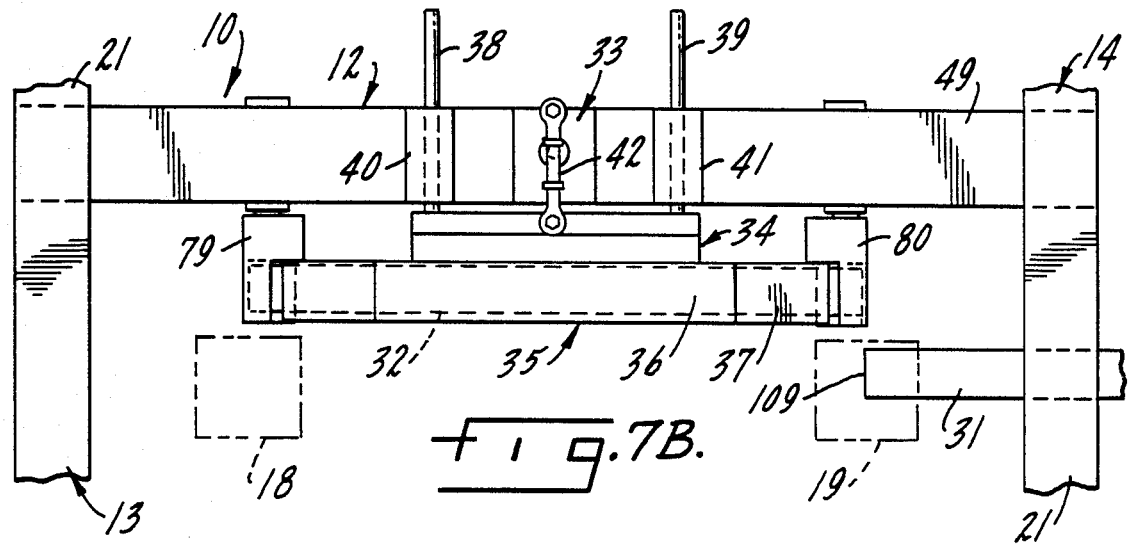
Figure 7C:
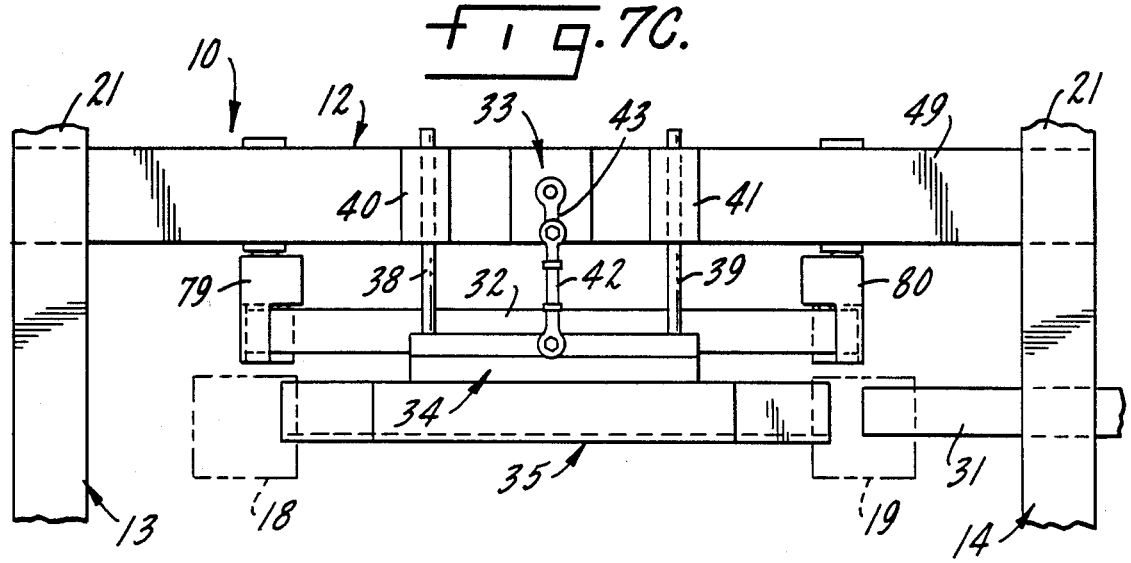

The sequence of operation illustrated in FIGS. 7A-C is as follows:

Steel strip stock from a source 31 is fed into the clamping station to the position of FIG. 7A. Clamp member 35 then clamps the steel strip between upper and lower clamp members. Die block 19 is operated to sever the free end portion of the steel strip stock to form the blank 32. If desired, die block 18 may also operate to trim the left end of the blank 32 to insure that a perfectly square left end will be available for subsequent welding.

After cut-off, and trim if desired, the clamp positioning system 44 is operated to move the blank 32 from the position of FIG. 7A to the position of FIG. 7B. When the clamped blank 32 reaches the position of FIG. 7B, a pair of weld grippers are actuated to grip the short, exposed ends of blank 32. At this time, then, the blank 32 is simultaneously held by the clamping system and the weld grippers.

After weld grippers are actuated, the clamping system is released, thereby unclamping said system from the blank 32 and leaving the blank held only by the weld grippers. The clamping system then moves to the position of FIG. 7C, which is the same position as is shown in FIG. 7A, to await the reception of the free end portion of the steel strip stock 31 of which the free leading edge is now indicated at 109.

Referring now to FIGS. 8A, 8B and 8C, it will be noted that FIG. 8A illustrates the blank 32 held by the weld grippers just prior to the bending operation. This position is equivalent to the position of the blank 32 and the weld grippers shown in FIG. 7C; it will be noted, however, that the clamping system has been omitted from FIG. 8A. Each of the weld grippers include a carriage 51 and 52, respectively, which slides on fixed rail means 50. Each carriage has a pivot housing indicated at 63 and 62, respectively, and each pivot housing carries a pivot arm 67 and 68, respectively. Each pivot arm 67 and 68 has a rigid weld clamp, indicated at 73 and 74, respectively, and each weld clamp carries a clamp finger, indicated at 75 and 76, respectively. Each clamp finger cooperates with a back up block, indicated at 81 and 82, respectively, carried by its associated pivot arm.

The weld gripper carriages are moved toward and away from one another by a two-piece linkage, the left linkage being designated 58, 59, which is actuated by any suitable means, and the right linkage as 56, 57, each of which is pivotally connected to its associated pivot housing.

A suitable welding apparatus, in this instance a micro plasma torch, is indicated at 85. The torch is mounted on a rail carriage 101 which reciprocates on a dual shaft rail assembly 94 which is mounted on a fixed support 110.

During the first increment of movement of the weld gripper carriages, 50 and 51, toward one another as illustrated in FIG. 8B, the pivot arm 68 moves from its position of approximately 10 degrees to the left of a vertical line passing through the rotational axis 111 to the FIG. 8B position. The force exerted on the pivot arm 68 by the blank 32, of course, insures that pivot arm 68 will rotate clockwise. The opposite pivot arm 67 will, of course, rotate counter clockwise. At the same time as, the two pivot arms are rotating, the blank 32 will be bent upwardly to an elevation substantially higher than its starting position of FIG. 8A.

When the weld gripper carriages 50 and 51 complete their travel toward one another, as illustrated in FIG. 8C, the pivot arms 67 and 68 will have swung to their closest opposed positions and the ends of the blank 32 will be disposed in opposed relationship. By a suitable proportioning of parts, the ends of blank 32 may be either in abutting contact or spaced any desired slight distance apart. At this time, the blank 32 will have been bent into a substantially circular configuration. In this position, the clamp fingers 75, 76, and their associated back up blocks 81 and 82 will hold the ends of blank 32 fixed with respect to one another preparatory to welding. The torch is then actuated to move forward across the region formed by the opposed ends of the blank 32 and weld the ends to one another to form a welded ring.

After welding, the pressure, clamping clamp fingers 75 and 76 to their respective back up blocks 81 and 82 is released. Thereafter, either before, during or after, but preferably after, the return of torch 85 to its initial position, ejector rods or pins 101 and 102 are actuated to move the newly formed welded ring out of the work station to a suitable discharge conveyor so as to clear the weld clamps 73 and 74.

As soon as the weld ring has been cleared, weld gripper carriages 51 and 52 are actuated to move away from one another; this action, by virtue of linkages 58, 59 and 56, 57 swings pivot arms 68 and 67 clockwise and counter clockwise, respectively, back to the positions of FIG. 7A and the weld system is now ready to receive another blank from the clamping system.

With the foregoing in mind, the description of FIGS. 1–5 will be facilitated and reference is now made to those Figures.

Figure 2:
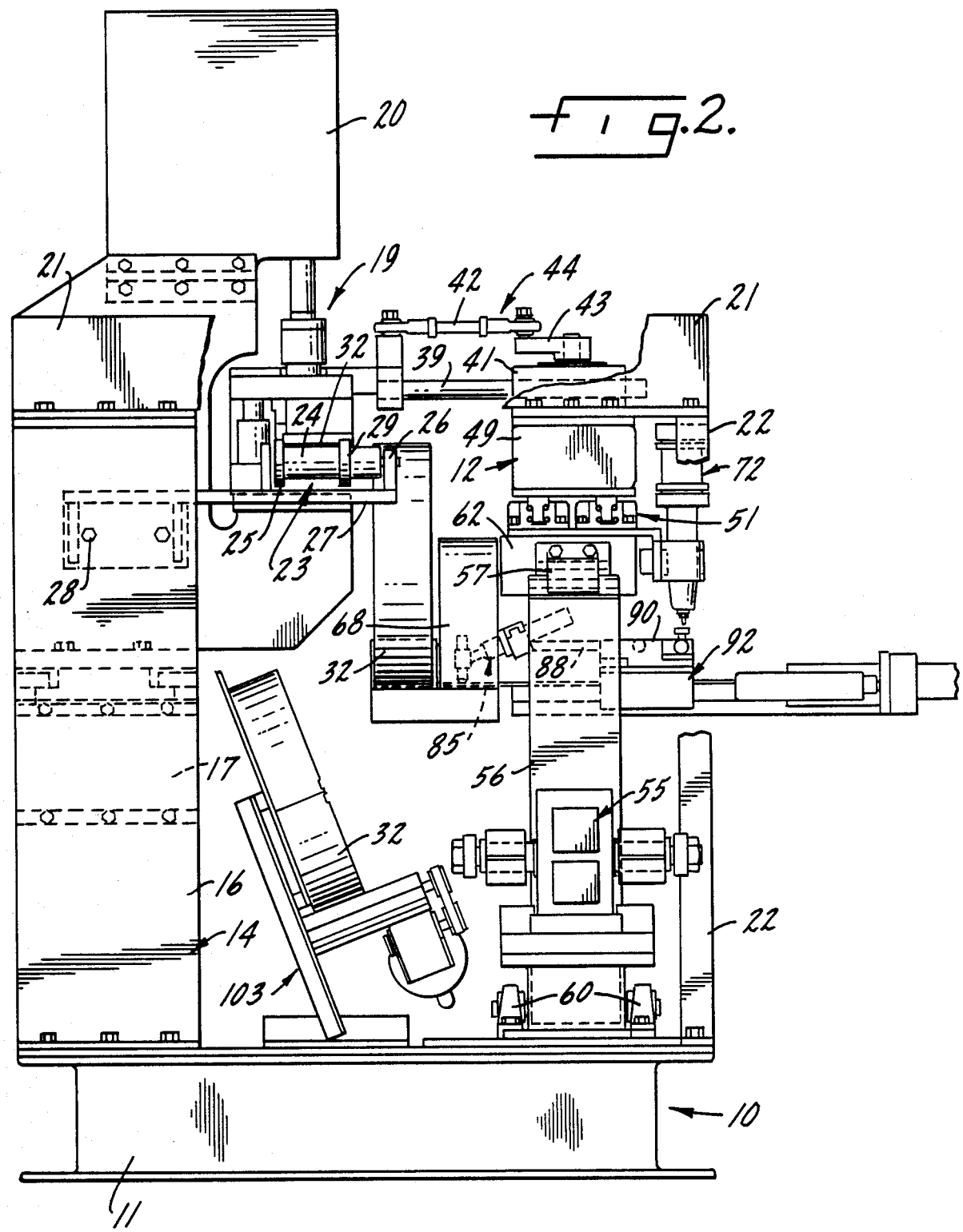
FIG. 2 is a right end elevation with portions broken away to show details.

A frame is indicated generally at 10 in FIGS. 1 and 2. It includes front and rear base members 11 and 12 and end base members 13 and 14. Left and right support posts are indicated at 15 and 16. A cross beam is indicated at 17, the cross beam providing a base for trim die 18 and cut-off die 19, the functions of which have been described elsewhere. The trim die 18 and cut-off die 19 are powered by cut-off press 20 shown in FIG. 2. One of two upper cross members is indicated at 21 and one of two rear posts at 22.

A material guide is indicated generally at 23, the material guide including a roller 24 rotatably supported in bracket 25, 26 which in turn are fixed to support plate 27 which is fastened to right support post 16 by bolts 28. A collar, 29, which is adjustable along the length of the roller 24 enables varying sizes of strip stock to be accommodated.

The material guide 23 further includes a bed plate 30, shown best in FIG. 1, on which the strip stock slides after passing over the roller 24.

A transverse feed system is indicted generally at 34. It includes a clamp member 35 which moves perpendicularly to the line of travel of strip stock through the machine between the forward position, shown in FIGS. 1, 2, 7A and 7C, and the rear or retracted position shown in FIG. 7B. The clamp member includes upper and lower jaw members 36, 37 which, as best seen in FIGS. 1 and 7B, extend to nearly the full length of a blank to be cut from the source of strip stock so that the material which is to form the blank, and thereafter the blank, is supported throughout nearly its entire length both before cut-off and thereafter until control of the blank is solely under the weld gripper. The clamp member 35 moves from position to position by means of guide rods 38, 39 which slide in suitable bores in guide rod anchors 40, 41 which in turn are supported by any suitable means at the rear of the machine. The guide rods and the guide anchors, together with an articulated linkage 42 which is powered by a crank 43, comprises the clamp positioning system 44.

Figure 3:
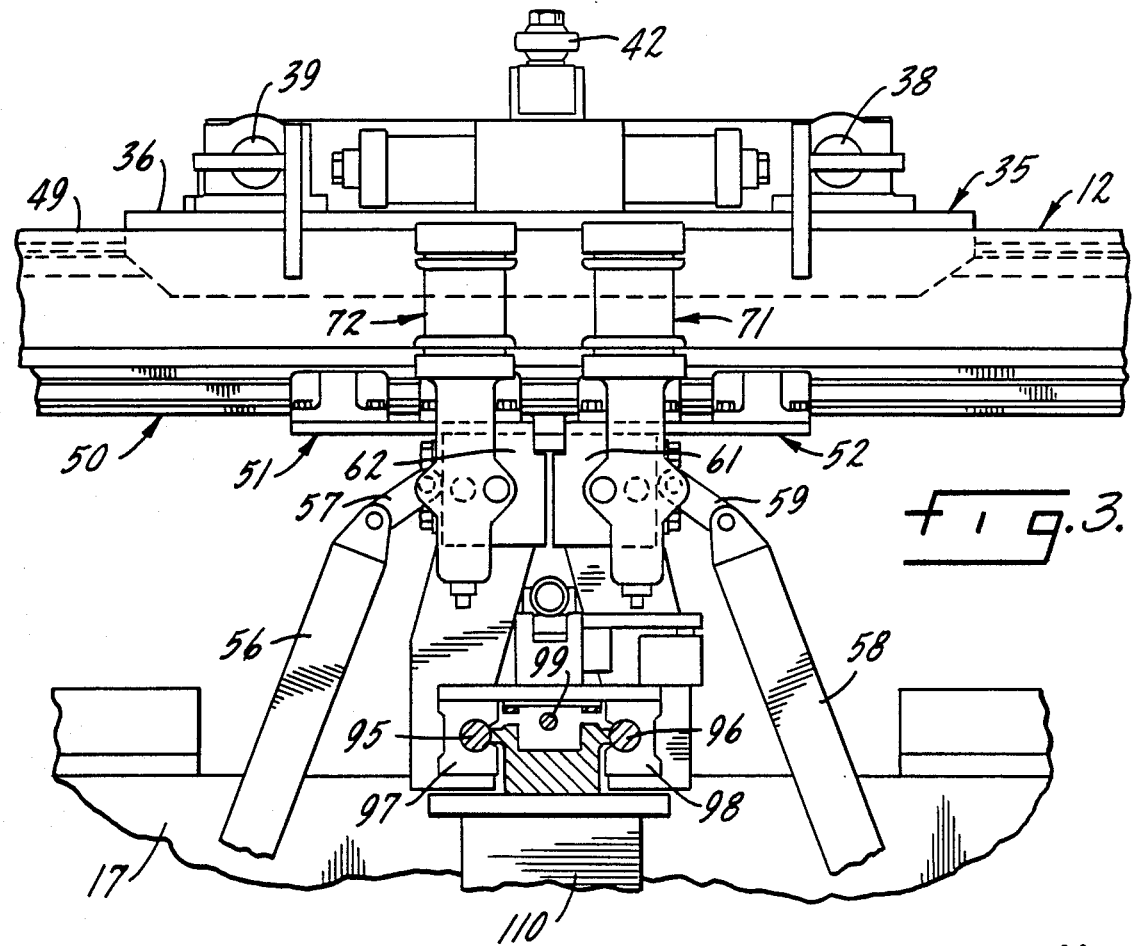
FIG. 3 is a rear elevation of a portion of FIG. 1 on an enlarged scale as contrasted to FIG. 1.

Referring now primarily to FIG. 3, a fixed rail means is indicated generally at 50, the rail means being supported by any suitable means integral with the frame structure, such as box frame member 49. A pair of weld gripper carriages are indicated generally at 51, 52, the carriages being mounted on the rail means for movement between their limit positions shown, at their closest approach, in FIGS. 1, 3, 5 and 8C, and at their furthest locations, in FIG. 8A.

Means for reciprocating the weld carriages and, during approaching movement, bending a blank cut from the strip stock into a substantially circular configuration, is illustrated best in FIGS. 1, 3, 5 and 8.

The carriage drive system is indicated generally at 55 in FIG. 2. It includes two pairs of linkages of which the right linkage consists of power link 56 and slave link 57, and the left linkage consists of power link 58 and slave link 59. Each power link is pivoted at its base around a pivot pin mounted in pairs of footpads 60 and the upper end of each slave link is pivotally connected to an associated pivot housing 61, 62. The pivot housings in turn are fast with an associated weld gripper carriage 51, 52, respectively. A stop mounting block which carries a stop block is indicated at 64. It functions as a means for limiting the travel of the weld gripper carriages 51, 52 toward one another, the stop block projecting downwardly beneath the lower surface of the carriage a distance sufficient to make abutting contact with notched areas in the inner corners of each of the pivot housing 61 and 62 as best seen in FIG. 5.

The pivot housings 61 and 62 carry pivot arms 67, 68, respectively, as best seen in FIG. 5. Each pivot arm is mounted on a shaft 69, 70, respectively, which is powered by an associated actuator 71, 72, respectively, best seen in FIG. 3. Pivot arm 67 carries a weld clamp 73 and pivot arm 68 carries a weld clamp 74. Weld clamp 73 carries a clamp finger 75 and weld clamp 74 carries a clamp finger 76. The weld clamps 73, 74 project forwardly from their associated pivot arms and are received on, and keyed to, stub shafts 77, 78. Each pivot arm terminates in a clamp base 79, 80. Back-up blocks are indicated at 81, 82, the back-up blocks cooperating with the clamped fingers to form support means and clamping means for the ends of a blank of stock carried by the pivot arms. The weld clamps 73, 74 are fixed with respect to their associated pivot arms 67, 68. Each pivot arm has associated with it a pneumatic power system which functions to swing its associated pivot arm in a direction to increase, or decrease, the clamping pressure exerted by its associated clamp finger on the blank and the back-up plate. For convenience, only a single pneumatic power control system, 81, is indicated.

Figure 4:
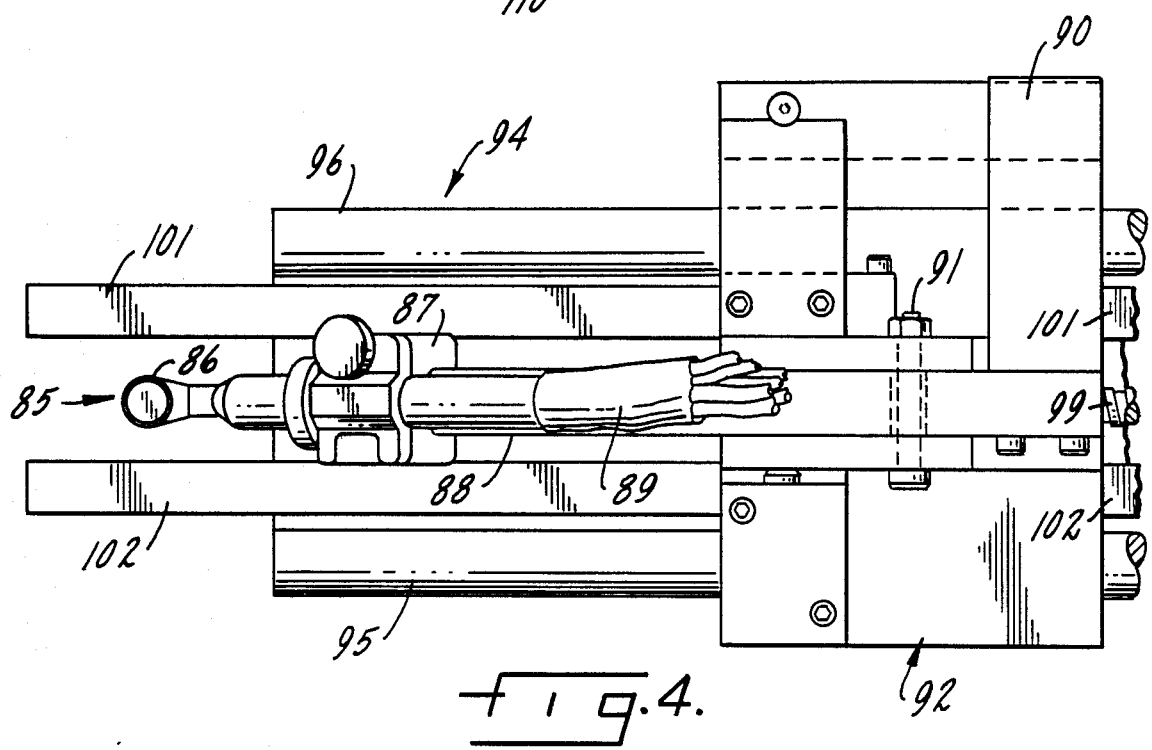
FIG. 4 is a partial top plan view of the torch drive.

The welding system is illustrated best in FIGS. 2, 4 and 5. A welding torch, in this instance a micro plasma torch, is indicated generally at 85. The torch consists of a barrel 86 which is held in position by a torch clamp 87 which in turn is pivotable about the forward end of torch support arm 88. Power and gas leads for the torch are indicated at 89 and are connected to any suitable sources, not shown. The torch support arm is carried by a pivot block 90, the torch support arm 88 being pivotable about pivot pin 91 on the pivot block. Any suitable adjustment mechanism, such as a height adjustment screw carried by the pivot block which, when raised, rotates the torch support arm counter clockwise about pivot pin 91, may be employed. Ordinarily, rotation of the torch support arm about pivot pin 91 will be used to accommodate differences in stock thickness, and the desired orientation of the torch with respect to the work is derived from adjusting the torch with respect to the torch support arm using the pivoting adjustment feature of the torch clamp.

The pivot block 90 is mounted on rail carriage 92 which moves in and out on a dual shaft rail assembly indicated generally at 94, the rails of which are indicated at 95, 96 in FIG. 3. The rail assembly includes two facing C-shaped members 97, 98 which are contoured to receive and slide along round rails 95, 96 of the rail assembly as best seen in FIG. 3. Power is supplied by a drive screw 99 which cooperates with a ball nut retained by a ball nut bracket which is fast with the rail carriage.

It will be understood that all parts which will heat in use are cooled by suitable means such as water conduits, and the parts associated with the operation of the torch, or in close proximity to it during operation, such as the clamp bases 79, 80, may be apertured to carry away hot exhaust gases.

After the welding sequence is finished, the torch is retracted and the just formed welded ring is ejected from the welding station of FIGS. 2 and 5 by ejectors which, in this instance, are ejector plates 101 and 102, shown best in FIGS. 4 and 8B.

Any suitable means may be used to receive the ejected part. In this instance, an exit conveyor, indicated generally at 103, is illustrated in FIG. 2.

One of the unique features of the invention is that the part may be made with stress relief notches which are formed at the same time as the blank is formed. Referring to FIGS. 2 and 6, it will be noted that the two notches, 105, 106, are present at the time welding begins, said notches having been incorporated in the trim die 107 and the cut-off die, 108. The notches were placed into the blank at the time the blank was simultaneously trimmed and cut off from the strip stock.

It will be understood that any suitable means may be provided for inter-relating the movement of the parts in the proper sequence, such as limit switches and limit switch actuators carried by moving parts which function to open or close circuits driving gear motors, hydraulic motors, etc. Since the provision of such an integrated movement system is well within the ability of one skilled in the art and would not facilitate an understanding of the invention, it is not specifically illustrated and described.

Although the invention has been illustrated and described in considerable detail above, it will be understood that the scope of the invention is intended to be limited solely by the scope of the hereafter appended claims, when interpreted in light of the relevant prior art, and not by the specific disclosure of the foregoing exemplary showing of the invention.

I claim:

1. In a ring welding machine,
   frame means for supporting the following operative means,
   means for supporting strip stock having a free end portion preparatory to being formed into a ring,
   means for clamping the free end portion of said strip stock preparatory to forming a blank therefrom,
   means for forming a blank from said strip stock while the free end portion of said strip stock is clamped in said clamping means,
   weld gripping means for gripping said formed blank,
   said clamping means being actuable to unclamp following gripping of said blank by the weld gripping means,
   means for bending a gripped blank into a substantially circular configuration having the blank ends in opposed relationship preparatory to welding,
   said weld gripping means being carried by the bending means,
   means for welding the opposed blank ends to form a ring, and
   means for ejecting the welded ring.

2. The ring welding machine of claim 1
   further characterized in that the weld gripping means is spaced from the blank in a direction transverse of the longest dimension of the blank, and
   further including means for,
   firstly, moving the blank, while clamped by the clamping means, to the weld gripping means preparatory to gripping by said weld gripping means and subsequent unclamping by the clamping means, and,
   secondly, returning the clamping means to a position preparatory to clamping the next blank.

3. The ring welding machine of claim 2 further including
   means for initiating operation of the clamping means to clamp the next blank prior to completion of ejection of the preceding welded blank.

4. The ring welding machine of claim 1 further characterized in that
   the blank forming means includes means for stress relief notching the ends of the blank at the same time the blank is formed from the strip stock.

5. The ring welding machine of claim 1 further characterized in that
   the bending means includes a pair of carriage bases mounted, on sideways carried by the frame means, to slide toward and away from one another along a straight lineal path during the weld gripping, bending, and return movements of the weld gripping means,
   a pivot arm carried by each carriage base, each of said pivot arms being pivotable about an axis which moves with its associated carriage base, each pivot arm carrying, at its end opposite the pivot axis, a weld gripping means, said carriage bases being movable toward one another commencing from the start position in which the weld gripping means are spaced the maximum distance from one another while gripping said blank, each of aid pivot arms being pivotable through approximately 180 degrees of rotation beginning with commencement of movement toward one another and ending with the ends of said gripped blank in opposing relationship preparatory to welding.

6. In a method of forming a welded ring from strip stock, clamping the end portion of a length of strip stock preparatory to forming a blank therefrom, forming a ring blank of a predetermined length from said clamped stock while the material from which said blank is formed is clamped and held in a fixed position, gripping the end portions of the formed blank and releasing the clamping force, bending the blank while gripped into a substantially circular configuration in which the ends of the blank are presented in opposed relationship preparatory to welding, welding the opposed ends of the bent blank while said blank is gripped to form a welded ring, and after welding, moving the welded ring from the welding region.

7. The welding method of claim 6 further characterized in that the welding is carried out by micro plasma torch means.

8. The welding method of claim 7 further characterized in that the non-bent blank is gripped prior to release of the clamping force.

9. The welding method of claim 7 further characterized in that the blank, following clamping, is bodily moved from its prior position in which it was clamped to a succeeding position in which it is thereafter bent and welded.

10. The welding method of claim 9 further characterized in that the flat, elongated blank is formed into a substantially circular configuration by movement of the gripped ends toward one another, and during at least a portion of the time said movement is occurring, the central portion of said blank is elevated above its starting position.

11. In a ring welding machine frame means supporting the following operative means, means for supporting strip stock having a free end portion preparatory to being formed into a ring, means for clamping the free end portion of said strip stock preparatory to forming a blank therefrom, means for forming a blank from said strip stock while the free end portion of said strip stock is clamped in said clamping means, weld gripping means for gripping said formed blank, said clamping means being actuable to unclamp following gripping of said blank by the weld gripping means, means for bending a gripped blank into a substantially circular configuration having the blank ends in opposed relationship preparatory to welding, said weld gripping means being carried by the bending means, micro plasma torch means for welding the opposed blank ends to form a ring, and means for ejecting the welded ring.

12. The ring welding machine of claim 11 further characterized in that the weld gripping means is spaced from the blank in a direction transverse of the longest dimension of the blank, and further including means for, firstly, moving the blank, while clamped by the clamping means, to the weld gripping means preparatory to gripping by said weld gripping means and subsequent unclamping by the clamping means, and secondly, returning the clamping means to a position preparatory to clamping the next blank.

13. The ring welding machine of claim 12 further including means for initiating operation of the clamping means to clamp the next blank prior to completion of ejection of the preceding welded blank.

14. The ring welding machine of claim 11 further characterized in that the blank forming means includes means for stress relief notching the ends of the blank at the same time the blank is formed from the strip stock.

* * * * *